(12) United States Patent
Paul et al.

(10) Patent No.: US 7,952,761 B2
(45) Date of Patent: May 31, 2011

(54) SYSTEM AND METHOD TO COMPENSATE STREAKS USING A SPATIALLY VARYING PRINTER MODEL AND RUN TIME UPDATES

(75) Inventors: Peter Paul, Webster, NY (US); Claude S. Fillion, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 393 days.

(21) Appl. No.: 12/277,594

(22) Filed: Nov. 25, 2008

(65) Prior Publication Data

US 2009/0296158 A1 Dec. 3, 2009

Related U.S. Application Data

(60) Provisional application No. 61/056,754, filed on May 28, 2008.

(51) Int. Cl.
*H04N 1/409* (2006.01)
(52) U.S. Cl. .......... 358/1.9; 358/3.06; 358/3.26; 399/49
(58) Field of Classification Search ............... 358/1.9, 358/3.01, 3.06, 3.26, 504; 399/49, 53
See application file for complete search history.

(56) References Cited

U.S. PATENT DOCUMENTS

| | | | |
|---|---|---|---|
| 4,553,033 A | 11/1985 | Hubble, III et al. | |
| 5,680,426 A * | 10/1997 | Ching-Ming | 378/8 |
| 5,749,020 A | 5/1998 | Mestha et al. | |
| 5,800,306 A * | 9/1998 | Mori | 477/62 |
| 5,963,244 A | 10/1999 | Mestha et al. | |
| 6,021,285 A | 2/2000 | Mestha et al. | |
| 6,345,128 B1 * | 2/2002 | Stokes | 382/254 |
| 6,636,628 B1 | 10/2003 | Wang et al. | |
| 6,697,582 B1 * | 2/2004 | Scheuer | 399/49 |
| 6,760,056 B2 | 7/2004 | Klassen et al. | |
| 7,127,187 B2 * | 10/2006 | Mo et al. | 399/49 |
| 7,236,711 B2 | 6/2007 | Burry et al. | |
| 7,268,913 B2 * | 9/2007 | Murashita | 358/1.9 |
| 7,411,688 B1 * | 8/2008 | Zhai et al. | 356/601 |
| 2003/0142110 A1 * | 7/2003 | Murashita | 345/600 |
| 2005/0036705 A1 | 2/2005 | Viassolo et al. | |
| 2005/0099446 A1 | 5/2005 | Mizes et al. | |
| 2005/0134623 A1 | 6/2005 | Mizes | |
| 2005/0134624 A1 | 6/2005 | Mizes | |
| 2006/0001911 A1 | 1/2006 | Viassolo et al. | |
| 2006/0077488 A1 | 4/2006 | Zhang et al. | |
| 2006/0087706 A1 * | 4/2006 | Shim et al. | 358/504 |
| 2006/0209101 A1 | 9/2006 | Mizes | |
| 2006/0245773 A1 * | 11/2006 | Gross et al. | 399/49 |
| 2007/0139733 A1 * | 6/2007 | Mizes et al. | 358/504 |
| 2007/0140552 A1 | 6/2007 | Fan et al. | |
| 2007/0165259 A1 | 7/2007 | Amorim | |
| 2007/0201097 A1 * | 8/2007 | Anderson et al. | 358/3.06 |
| 2008/0075492 A1 * | 3/2008 | Mestha et al. | 399/49 |
| 2008/0239344 A1 * | 10/2008 | Wang et al. | 358/1.9 |
| 2010/0220363 A1 * | 9/2010 | Paul et al. | 358/3.26 |

OTHER PUBLICATIONS

Non-Final Office Action mailed Jan. 5, 2011 in U.S. Appl. No. 12/112,618, pp. 1-20.
"Notice of References Cited, "from Non-Final Office Action mailed Jan. 5, 2011 in U.S. Appl. No. 12/112,618.

* cited by examiner

*Primary Examiner* — Kimberly A Williams
(74) *Attorney, Agent, or Firm* — Fay Sharpe LLP (57) ABSTRACT

Systems and methods are provided for compensating for streak defects in images formed by an image forming device, such as a digital printer. The methods include using a spatially varying printer model and run time updates to generate spatially varying tone reproduction curves (STRC actuation) in an iterative control system for improving streak correction in a digital printing machine. Streaks are rapidly learned and eliminated at cycle-up and tracked and eliminated during print run time using STRC actuation.

21 Claims, 8 Drawing Sheets

SYSTEM AND METHOD TO COMPENSATE STREAKS USING A SPATIALLY VARYING PRINTER MODEL AND RUN TIME UPDATES

CROSS REFERENCE TO RELATED APPLICATIONS

This application claims the benefit of U.S. Provisional Application No. 61/056,754, filed May 28, 2008 which is hereby totally incorporated by reference herein.

Attention is directed to co-pending application: U.S. application Ser. No. 12/112,618 filed Apr. 30, 2008, entitled "METHOD OF CORRECTING STREAKS USING EXPOSURE MODULATION AND SPATIALLY VARYING TRCS" which is hereby totally incorporated by reference herein.

BACKGROUND

This disclosure relates to a printing machine and method. Specifically, the disclosed printing machine and method relate to scanning a P/R (Photoreceptor Belt) for image non-uniformities and controlling the printing process to reduce or correct the image non-uniformities. The present systems and methods relate to the field of digital imaging and, more particularly, to a system and method compensating for streaks and other image artifacts that appear on images which run parallel to the printer's process direction by using a spatially varying printer model, run time updates, and spatially varying TRC actuation.

A typical electrophotographic, or xerographic, printing machine employs a photoreceptor, that is charged to a substantially uniform potential so as to sensitize the surface thereof. The charged portion of the photoreceptor is exposed to a light image of an original document being reproduced. Exposure of the charged photoreceptor selectively dissipates the charge thereon in the irradiated areas to record an electrostatic latent image on the photoreceptor corresponding to the image contained within the original document. The location of the electrical charge forming the latent image is usually optically controlled. More specifically, in a digital xerographic system, the formation of the latent image is controlled by a raster output scanning device, usually a laser or LED source.

After the electrostatic latent image is recorded on the photoreceptor, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image, forming a visible powder image on the photoconductive surface. After the electrostatic latent image is developed with the toner particles, the toner powder image is transferred to a sheet, such as paper or other substrate sheets, using pressure and heat to fuse the toner image to the sheet to form a print.

Electrophotographic printing machines of this type can produce color prints using a plurality of stations. Each station has a charging device for charging the photoconductive surface, an exposing device for selectively illuminating the charged portions of the photoconductive surface to record an electrostatic latent image thereon, and a developer unit for developing the electrostatic latent image with toner particles. Each developer unit deposits different color toner particles on the respective electrostatic latent image. The images are developed, at least partially in superimposed registration with one another, to form a multi-color toner powder image. The resultant multi-color powder image is subsequently transferred to a sheet. The transferred multi-color image is then permanently fused to the sheet forming the color print.

Although these xerographic printing machines usually produce a faithful reproduction of the original image, defects in the subsystems of the xerographic system may give rise to cross-process non-uniformities, commonly referred to as streaks or streak defects, which can be a significant factor effecting the overall image quality of the print. Streaks are primarily one-dimensional visible defects in the image that run parallel to the process direction, also referred to as the slow-scan direction. In a uniform gray level patch, streaks may appear as a variation in the reflectance, optical density, or in the calorimetric CIELAB L* value, among other units of color variation well known to practitioners of the art. As used herein, "gray" refers to the digital area coverage value of any single color separation layer, whether the toner is black, cyan, magenta, yellow, or some other color. In a color xerographic machine, streaks in single color separations that may be unobjectionable can cause an undesirable visible color shift for overlaid colors.

Figure 1:
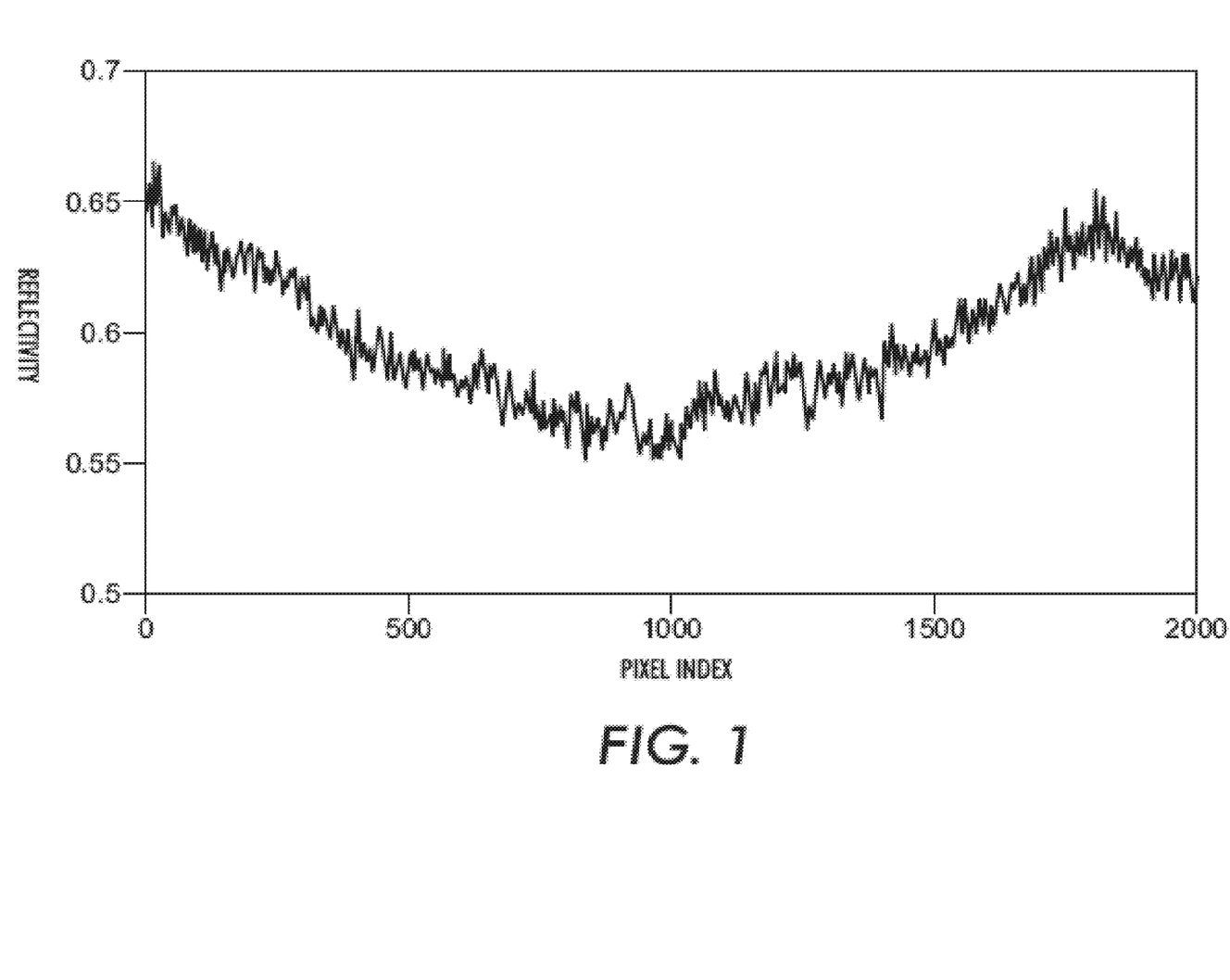
FIG. 1 illustrates an example of a measured luminance reflectance profile in a fast-scan direction for a single color separation.

Conventional printing technologies contain several sources of streaks which cannot be satisfactorily controlled via printer design or printing system optimization. Streaks can be caused by "non-ideal" responses of xerographic components in the marking engine. The source of these artifacts is found in toner adhered on the wires, in dirt on the charging elements, P/R streaks, fuser originated streaks, charge contamination, etc. Streaks can also be caused by non-uniformity of the raster output scanning device spot-size or intensity variations. As shown in FIG. 1, a measured reflectance profile of a single color test image generated by the image forming machine is shown. The reflectance profile is generated by measuring the reflectivity of the image in the cross-process direction. The x-axis in FIG. 1 represents the pixel index in the cross-process direction. The pixel index value represents a location in the cross-process, or "fast scan", direction. The measured reflectance profile illustrates streaks that would manifest themselves as undesired variations in cross-process L* in the test image measured on paper. A desired reflectance profile would be flat.

Various control schemes have been used for correcting streaks in image forming machines. ROS actuation for streak correction has been used, as disclosed US Publication No. 2006/0001911 A1 for "Closed-loop compensation of streaks by ROS intensity variation" by Viassolo et al. The intensity of the illumination source of the raster output scanner is controlled as a function of the fast-scan position to compensate for streaks in the image.

Spatially varying tone reproduction curves (STRCs) have also been used to modify the input image "contone" ("continuous tone") data, to derive compensated gray levels to correct the spatial non-uniformities, such as is taught by US Publication No. 2006/0077488 A1 for "Methods and systems achieving print uniformity using reduced memory or computational requirements" by Zhang, et al.

BRIEF DESCRIPTION

A system and method for compensating for streak defects in images formed by a digital printer having a full width sensing device and spatially varying Tone Reproduction Curve application device.

The method includes developing test images on a sensing substrate, sensing the cross-process reflectance of the developed images on the sensing substrate, generating reflectance profile data of the test images using the sensed cross-process reflectance, generating a spatially varying printer model, generating corrections from the measured reflectance profile data and the spatially varying printer model, updating the corrections based on subsequent measurements, using the correction for the spatially varying tone reproduction curve (STRC) actuator in the digital image, and then generating a streak-corrected image.

The system includes a full width sensing device for sensing the cross-process reflectance of test images formed on the sensing substrate, and a controller for generating STRC for use in generating a streak-corrected image as described herein.

DETAILED DESCRIPTION

Exemplary embodiments shall be described for systems and methods of correcting non-uniformities, or streaks, in images formed by a xerographic image forming device wherein defects are corrected using spatially varying tone reproduction curves.

Figure 2:
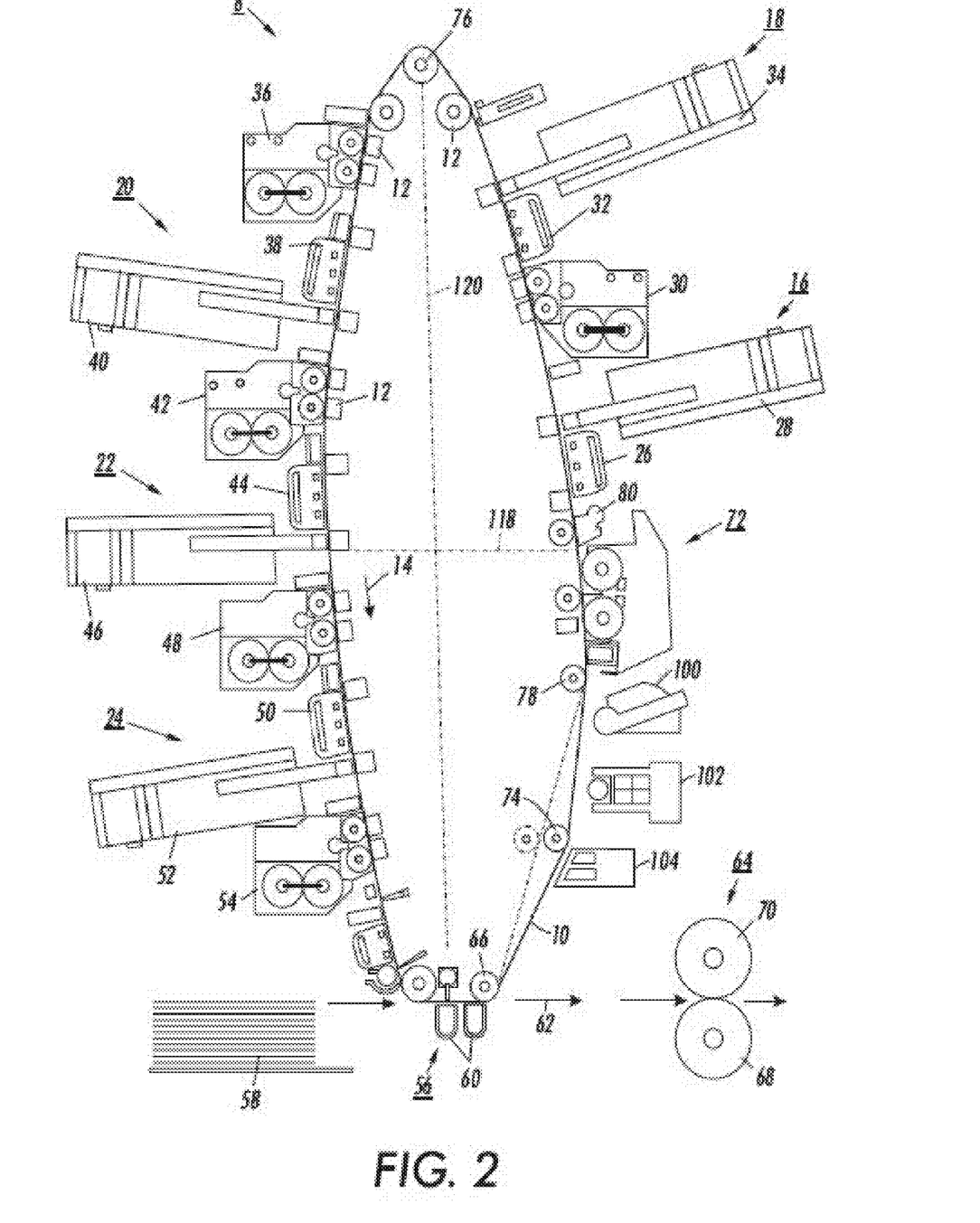
FIG. 2 illustrates a digital printer according to an exemplary embodiment of this disclosure.
Figure 3:
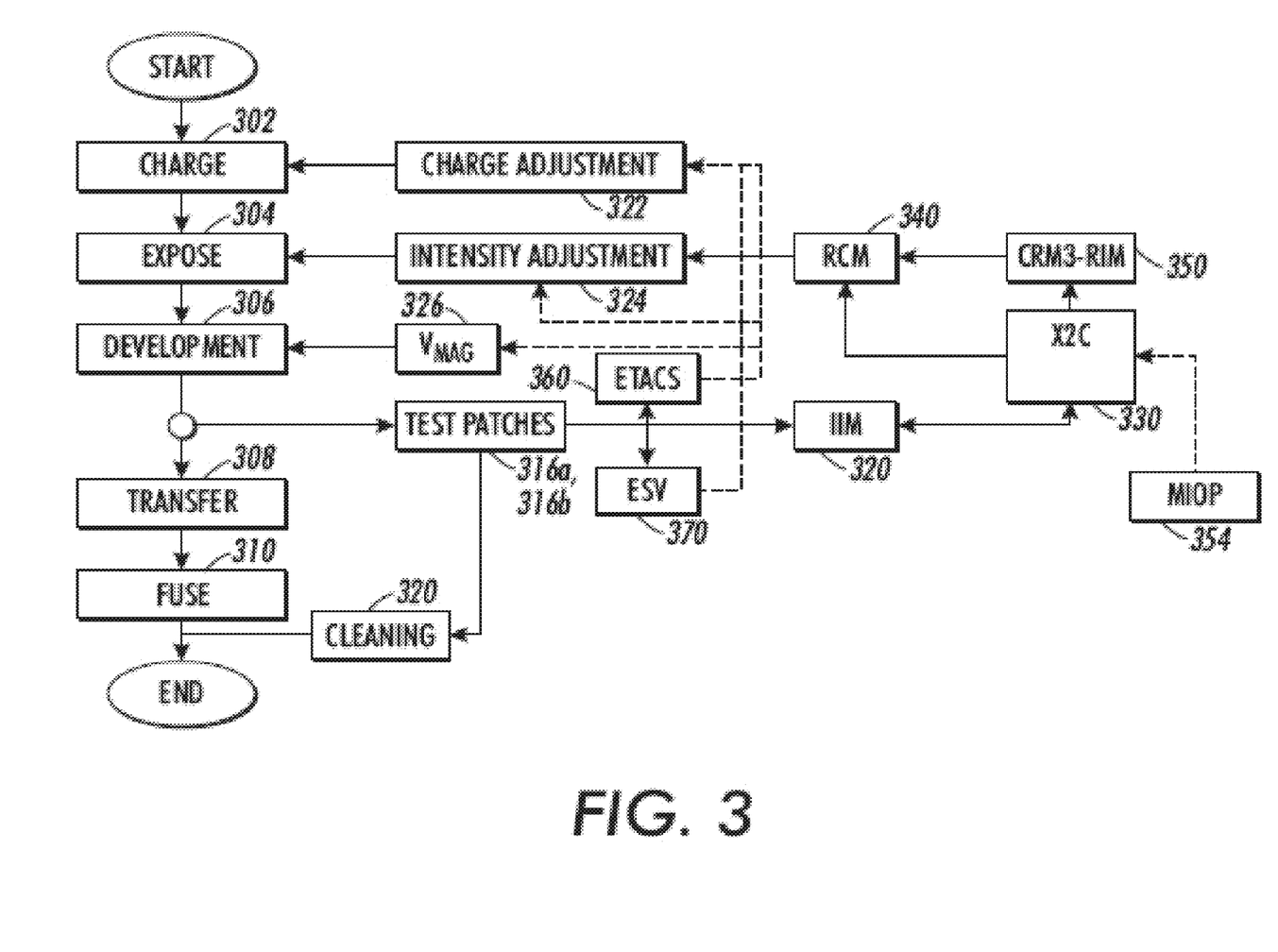
FIG. 3 illustrates a system for correcting streak defects according to an exemplary embodiment of this disclosure.

With reference to FIGS. 2 and 3, a printing machine is illustrated generally at 8 according to an exemplary embodiment of this disclosure. The printing machine 8 is a single pass multi-color digital printer, also known as a xerographic or electrophotographic image forming device. The digital printer 8 described herein is a Xerox iGen3™ Digital Production Press and is provided by way of example, it should be appreciated that the systems and methods for compensating for image streaks, described herein, are suitable for use in other image forming devices.

The digital printer 8 employs a photoconductive/photoreceptor (P/R) belt 10 supported by a plurality of backer rollers or backer bars 12. The P/R belt 10 is arranged in a vertical orientation. P/R belt 10 advances in the process direction shown by 14 to move successive portions of the external surface of P/R belt 10 sequentially beneath the various processing stations disposed about the path of movement thereof.

The printing machine architecture can include five image recording stations, indicated generally by the reference numerals 16, 18, 20, 22, and 24, respectively, each corresponding to a different color separation. Initially, belt 10 passes through image recording station 16. Image recording station 16 includes a charging device and an exposure device. The charging device includes a corona generator 26 that charges the exterior surface of P/R belt 10 to a relatively high, substantially uniform potential during a charging operation as shown at 302 in FIG. 3. After the exterior surface of P/R belt 10 is charged, the charged portion thereof advances to the exposure device. The exposure device includes a raster output scanner (ROS) 28, which illuminates the charged portion of the exterior surface of P/R belt 10 to record a first electrostatic latent image thereon during an exposure operation as shown at 304. Alternatively, a light emitting diode (LED) may be used as the illumination source in the ROS device.

This first electrostatic latent image is then developed by developer unit 30 during a development operation 306. Developer unit 30 deposits toner particles of a selected first color on the first electrostatic latent image. After the first color toner image has been developed on the exterior surface of P/R belt 10, belt 10 continues to advance in the process direction of arrow 14 to image recording station 18.

Image recording station 18 includes a charging device and an exposure device. The charging device includes a corona generator 32 which recharges the exterior surface of P/R belt 10 to a relatively high, substantially uniform potential during a charging operation 302. The exposure device includes a ROS 34 which illuminates the charged portion of the exterior surface of P/R belt 10 to selectively record a second electrostatic latent image thereon during an exposure operation 304. This second electrostatic latent image corresponds to the regions to be developed with second color toner particles, such as magenta toner particles. This second electrostatic latent image is now advanced to the next successive developer unit 36.

Developer unit 36 deposits magenta toner particles on the electrostatic latent image during a development operation 306. In this way, a magenta toner powder image is formed on the exterior surface of P/R belt 10. After the magenta toner powder image has been developed on the exterior surface of P/R belt 10, P/R belt 10 continues to advance in the process direction of arrow 14 to image recording stations 20, 22 and 24.

Image recording stations 20, 22 and 24 also include charging devices and exposure devices similar to those described above. The charging devices includes corona generators 38, 44 and 50 which recharge the photoconductive surface to a relatively high, substantially uniform potential during charging operations 302. The exposure devices also include ROS 40, 46 and 52 respectively, which illuminate the charged portion of the exterior surface of P/R belt 10, during exposure operations 304, to selectively dissipate the charge thereon for recording third, fourth and fifth electrostatic latent images corresponding to the regions to be developed with corresponding color toner particles, such as yellow, cyan and black toner particles, respectively.

The third, fourth or fifth electrostatic latent images are then advanced to their respective developer units 42, 48, or 54 which deposits yellow, cyan or black toner particles on the exterior surface of P/R belt 10, during development operations 306, to form toner powder images thereon thereby developing the third, fourth and fifth electrostatic latent images. These toner particles may be partially superimposed and registered with the previously formed powder images. The black toner particles may be totally superimposed and registered with the previously formed powder images.

In this way, a multi-color toner powder image is formed on the exterior surface of P/R belt 10. Thereafter, P/R belt 10 advances the multi-color toner powder image to a transfer station, indicated generally by the reference numeral 56 for the transfer operation 308.

At transfer station 56, a receiving medium, i.e., paper, is advanced from stack 58 by sheet feeders and guided to transfer station 56. At transfer station 56, a corona generating device 60 sprays ions onto the back side of the paper. This attracts the developed multi-color toner image from the exterior surface of P/R belt 10 to the sheet of paper. Stripping assist roller 66 contacts the interior surface of P/R belt 10 and provides a sufficiently sharp bend thereat so that the beam strength of the advancing paper strips from P/R belt 10. A vacuum transport moves the sheet of paper in the direction of arrow 62 to fusing station 64 for the fusing operation 310.

Fusing station 64 includes a heated fuser roller 70 and a backup roller 68. The back-up roller 68 is resiliently urged into engagement with the fuser roller 70 to form a nip through which the sheet of paper passes. In the fusing operation, the toner particles coalesce with one another and bond to the sheet in image configuration, forming a multi-color image thereon. After fusing, the finished sheet is discharged to a finishing station where the sheets are compiled and formed into sets which may be bound to one another. These sets are then advanced to a catch tray for subsequent removal therefrom by the printing machine operator.

One skilled in the art will appreciate that while the multi-color developed image has been disclosed as being transferred to paper, it may be transferred to an intermediate member, such as a belt or drum, and then subsequently transferred and fused to the paper. Furthermore, while toner powder images and toner particles have been disclosed herein, one skilled in the art will appreciate that a liquid developer material employing toner particles in a liquid carrier may also be used.

It has been found that the use of a spatially varying Printer Model, Print Run Time updates, and time varying STRC can improve streak correction in image forming machines more effectively over a print job than using static STRC. Combining a spatially varying Printer Model with Print Run Time updates enables the system to compensate for streaks that change during a print job. Further, the system becomes more robust to measurement noise, since more than one measurement is used in the time varying STRC generation.

Figure 7:
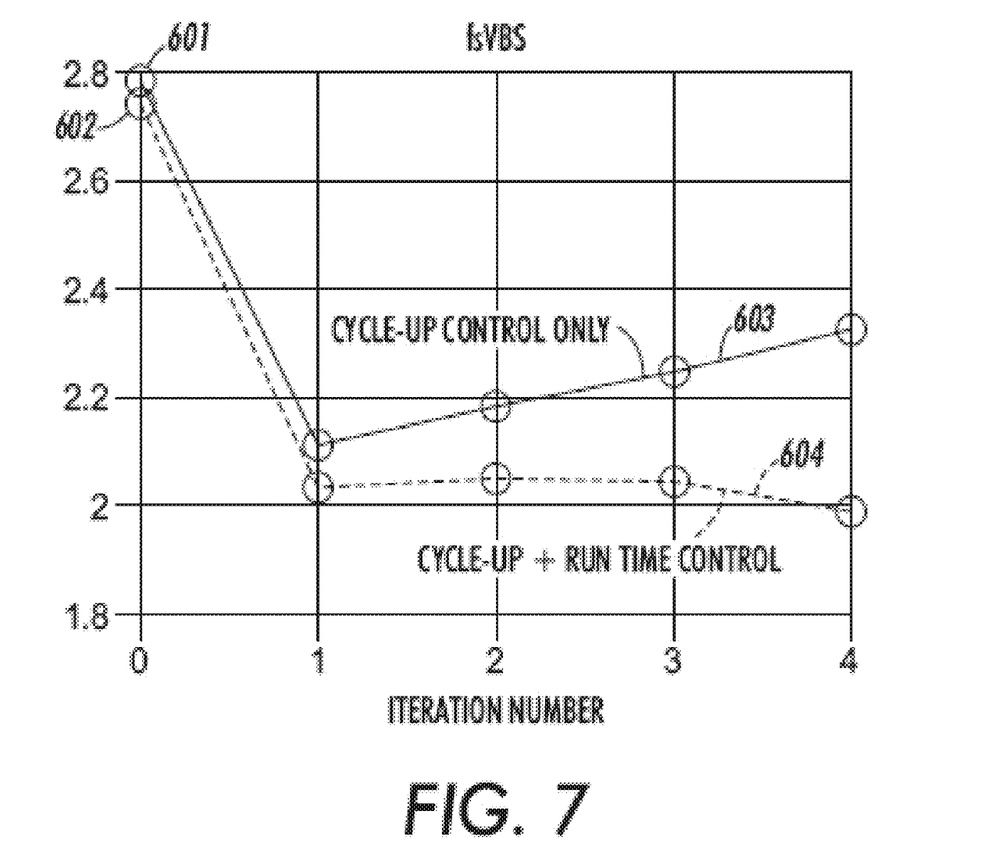
FIG. 7 illustrates the performance of an exemplary embodiment of this disclosure.

These considerations are illustrated in FIGS. 1 and 7. FIG. 1 illustrates a measured reflectance profile, showing large (widely spaced) inboard/outboard differential reflectively appearing as broad streaks on prints. The reflectance profile also includes high frequency (closely spaced) differential reflectivity of smaller magnitudes appearing as narrow streaks. In FIG. 7, graph points 601 and 602 illustrate the result of not compensating for streaks which results in a streak metric score of approximately 2.8, where lower numbers represent better streak compensation performance. In FIG. 7, graph 603 represents compensating a print using only static STRC actuation, which compensates streaks for a short duration as evidenced by the lower streak metric score for iteration 1, but does not compensate the time varying streaks as evidenced by the higher streak metric score for iterations 2, 3, and 4. FIG. 7 graph 604 illustrates the result of compensating the print using time varying STRC actuation calculated using a spatially varying Printer Model and Print Run Time updates, showing that the streak metric score is lower at iterations 1 through 4.

Though the static STRC actuator may be able to compensate the streaks for a short duration. Successive repetition of compensation using static STRCs would yield a large productivity loss since a large amount of data is required to generate the static STRC actuator values to compensate for the streaks. It has been found that streaks can change rapidly due to rapidly changing states within the printer.

Figure 4:
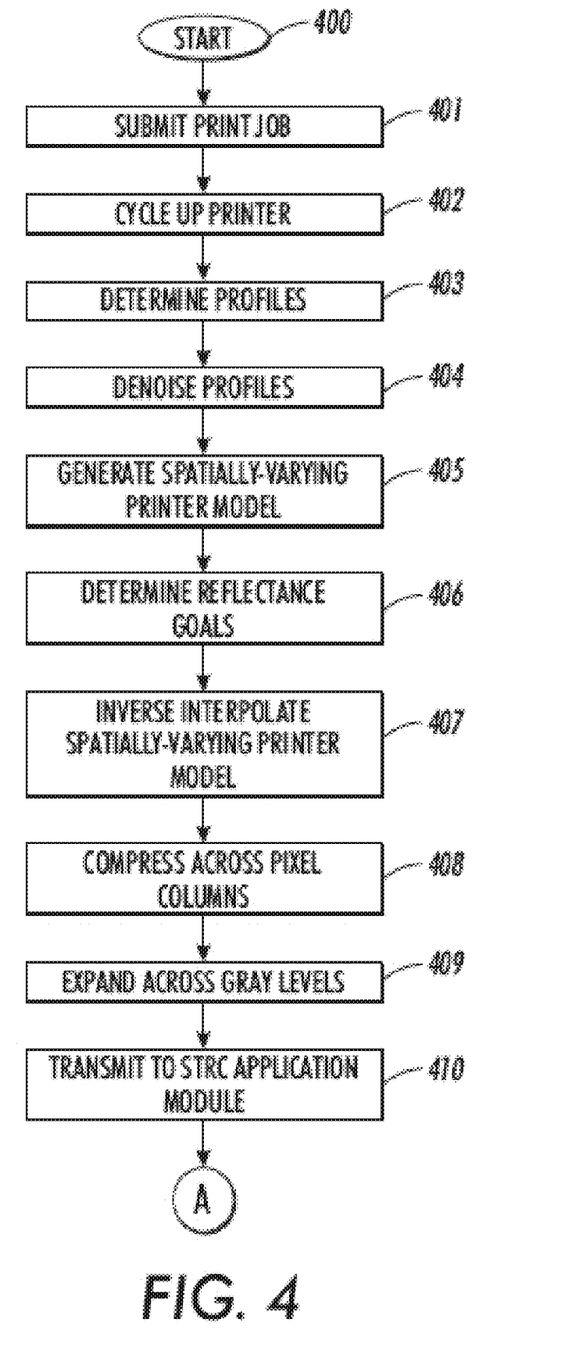
FIG. 4 illustrates a process for correcting streak defects at machine start up according to an exemplary embodiment of this disclosure.
Figure 5:
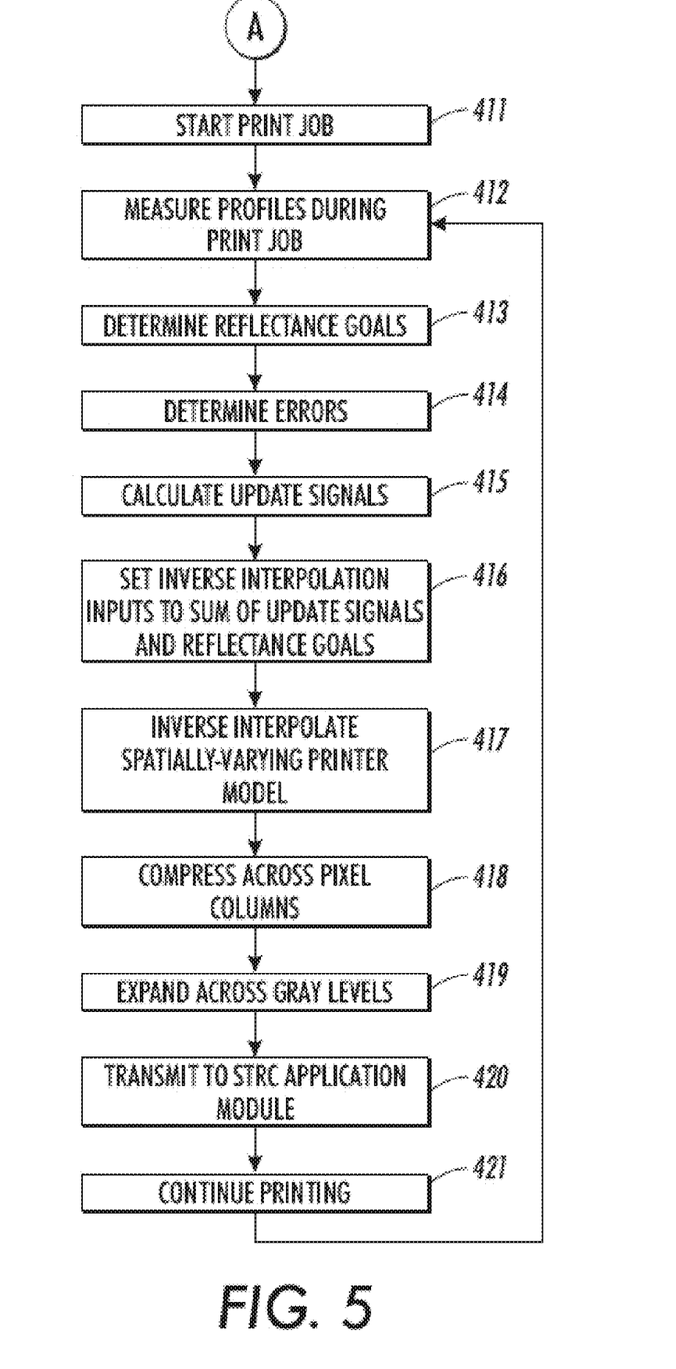
FIG. 5 illustrates a process for correcting streak defects at machine runtime printing according to an exemplary embodiment of this disclosure.
Figure 6:
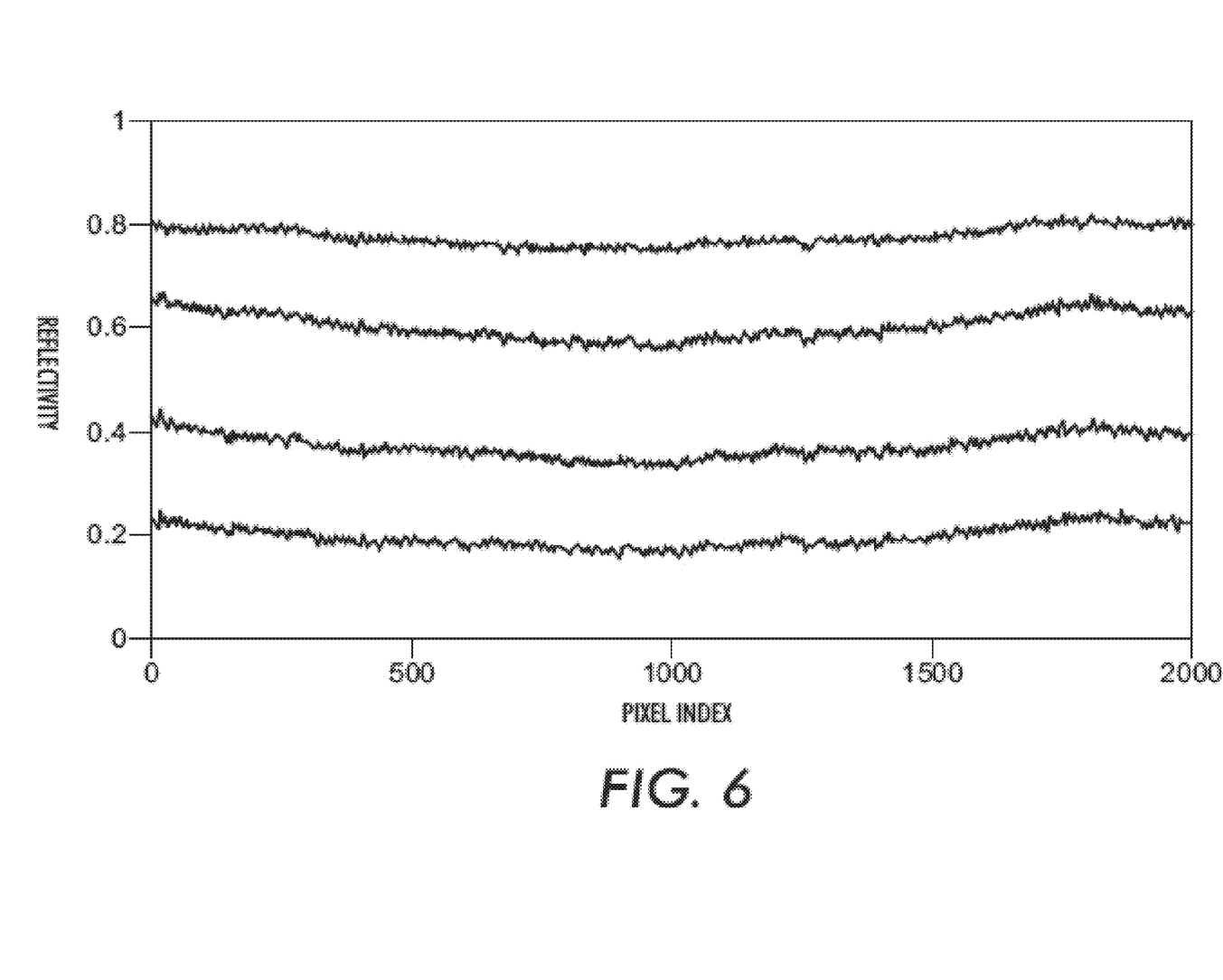
FIG. 6 shows the cross-process reflectance profile for 4 patches of a given color separation for 4 area coverages, provided by a test image illustrating visual color non-uniformities, or streaks.

Referring now to FIGS. 3-5, an exemplary embodiment of a system and method utilizing a spatially varying Printer Model and Run Time updates to generate time varying STRCs is illustrated. The details of the exemplary embodiment are described below. Control and mathematical operations in the steps described in FIGS. 4 and 5 are performed by a signal processing and control unit X2C 330.

A print job is submitted at 401 and the printer is cycled up in a start up operation at 402. Machine startup mode, also known as cycle up or Cycle Up Conversion (CUC), typically occurs prior to and in preparation for runtime mode wherein the machine is ready for operation and during which print jobs are performed.

The reflectance profiles are determined at 403. During the cycle up procedure 402, the reflectance profiles for several area coverage levels for each color are obtained. In the exemplary embodiment, the number is 16 area coverage levels uniformly sampled from 2% area coverage to 100% area coverage. Prior art US Publication No. 2006/0209101 for "Systems and Methods for Measuring Uniformity in Images" by Mizes, which is incorporated herein by reference in its entirety, teaches a way to obtain reflectance profiles. In one example which should not be considered limiting, test images in the form of patches 316a are generated on a sensing substrate such as the P/R belt 10 at 402 utilizing one or more of the image recording stations 16, 18, 20, 22, and 24 performing one or more charging 302, exposing 304 and developing 306 operations in manners similar to those described above. In another example, the test images 316a are generated on an intermediate belt or drum sensing substrate. In another example, the test images 316a are printed on output media sensing substrate. The example test patches 316a have a process direction dimension and span the entire width of the cross process direction. In the example provided herein, which should not be considered limiting, the test patches 316a have a process direction dimension of 1 inch.

The reflectivity of these test patches 316a are then measured with an in situ sensor 100 having a field of view which spans the entire width of the cross process direction. The sensor 100 has a speed of capture sufficient for capturing the full 1 inch process direction dimension of the patch 316a as the patch passes the sensor. The captured signal can then be averaged in the process direction, yielding a signature profile that spans the full cross process direction width. In a typical embodiment the sensor 100 may be a full width array sensor. However, in another embodiment the sensor 100 may be a reduction optics camera sensor. In a typical embodiment the measurement is made on a photoreceptor 10, or intermediate drum or belt. In an alternate embodiment, the measurement is made in situ on the final output media.

The reflectance profiles are Denoised at 404. Due to process noises and halftoning, the reflectance profiles may contain unwanted signals. Standard signal processing techniques to remove noise from the profiles are then applied. In an exemplary embodiment, a singular value decomposition based denoising method is applied at 404. In another embodiment, standard convolution or Fourier based filtering may be used to remove noise from the profiles.

The denoised reflectance profiles are then used to generate a spatially-varying printer model at 405. In an exemplary embodiment this is performed as a simple linear interpolation of the denoised reflectance profiles across area coverage on a per pixel index basis. In other embodiments higher order polynomial or spline based interpolation is used. The interpolation is modified so that the resulting model is monotonic in reflectance as a function of area coverage for each pixel index along the entire cross-process direction width. In an exemplary embodiment this is performed by starting at the reflectance for 2% area coverage for each pixel index across the cross-process dimension and adjusting the reflectance values of the denoised profiles for each increasing area coverage so that the resulting adjusted reflectance values as a function of area coverage are monotonic. Thus, since the resulting reflectance values, which are the nodes of the interpolation, are monotonic as a function of area coverage, and linear interpolation in the area coverage dimension is used, the resulting spatially varying printer model is also monotonic as a function of area coverage for each pixel index along the whole cross-process direction width. The Spatially-Varying Printer Model is stored for use in the cycle-up procedure, shown in FIG. 4, as well as in the run time procedure, shown in FIG. 5.

The Reflectance Goals are then determined at 406. The reflectance goal for each area coverage is the reflectance value to which the system is to drive the output for that input area coverage. A reflectance goal for each of the area coverage levels used to produce the reflectance profiles is determined. In an exemplary embodiment, the reflectance goal for each reflectance profile associated with each input area coverage is determined by averaging the reflectance profile at the cross-process direction location where a process controls sensor is located. This insures that the streaks compensation system and the process controls system work without interfering with each other to reduce streaks while maintaining proper average density across the cross-process dimension of the reflectance profile. The number of pixels at the process controls sensor cross-process direction location used is a value that is equivalent to the dimension of the process controls sensor field of view plus a few pixels on either side to reduce noise. In an exemplary embodiment this could be the number of pixels equivalent to 15 mm. In an alternate embodiment, the reflectance goal for each reflectance profile could be determined by averaging the whole cross-process width of the reflectance profile. In another alternate embodiment, the reflectance goal for each reflectance profile could be specified by the operator or an external system.

The Spatially-Varying Printer Model is then inverse interpolated at 407. The reflectance goal and the spatially varying printer model are then used to determine the input area coverage required for each pixel index of each profile to reach its reflectance goal at its output. Since in an exemplary embodiment, the spatially-varying printer model is insured to be monotonic, simple linear inverse function interpolation is used. The resulting set of area coverage remapping values for each profile for each pixel index define a Spatially Varying TRC.

Compression Across Pixel indices is performed at 408. In an exemplary embodiment, high resolution reflectance profiles in the cross-process direction may result in more than 2000 Spatially Varying TRCs. This may be too many for transmission, storage, and processing in real time application to image pixels. In an exemplary embodiment, standard singular value decomposition based compression is used to define means and basis functions across area coverage levels, and weights across pixel indices. A data compression ratio of 8:1 is used in an exemplary embodiment, though other compression ratios can be used.

Expansion Across Gray Levels is then performed at 409. Spatially-Varying TRCs are required to be defined for each gray level. In an exemplary embodiment this is from 0 to 255, and simple linear interpolation is used to expand the mean and the basis vectors from 16 elements to 256 elements. In alternate embodiments, polynomial or spine based interpolation can be used in the expansion. The result is transmitted to Spatial TRC Application Module 410. In an exemplary embodiment, the mean, basis vectors, and weights which define the compressed spatially-varying TRCs are then transmitted through standard electronic signal interfacing methods to the image processing module that applies the spatially-varying TRCs to the images to compensate for the streaks using methods taught by US Publication No. 2006/0077488 A1 for "Methods and systems achieving print uniformity using reduced memory or computational requirements" by Yeqing, et al. which is hereby incorporated by reference herein.

Referring now to FIG. 5, a Print Job is started 411. Upon completion of the Cycle-Up procedures shown in FIG. 4, the print job starts in a standard manner. The Spatially-Varying TRCs that were calculated in the Cycle-Up procedure of FIG. 4 are applied to the print job images to compensate for streaks during the print job.

Reflectance profiles are measured during the print job 412. To update the Spatially-Varying TRCs to compensate for time-varying streaks, measurements of the reflectance profiles which have had the previously calculated Spatially-Varying TRCs applied are used. In an exemplary embodiment, patches 316*b* having a length dimension of 1 inch in the process direction and a width in the cross-process direction which spans the full printing width are printed in interdocument zones. The system measures the same area coverage levels as in the Cycle-Up procedure. The system measures 4 out of the 16 profiles before it performs an update. In an alternate embodiment, very short patches in the process direction having a width in the cross-process direction spanning the full printing width are printed at the lead edge, or trail edge, or both lead and trail edges of a customer output print on a part of the paper that is to be trimmed off or otherwise hidden from view in the final document. In another alternate embodiment, the patches are printed in the customer zone and the machine skips a pitch in order to make the measurements.

Reflectance Goals are determined at 413 using a similar procedure as in the step 406, described above.

Errors are then determined at 414. Errors in reflectance from the goal reflectance are used to derive new Spatially-Varying TRCs which will compensate the new or changed streaks. The errors are calculated for each pixel index on each profile by subtracting the reflectance profile value for each pixel index from the reflectance goal for that reflectance profile.

Update Signals are then calculated at 415. Each pixel on each profile becomes a standard error feedback control system. Standard control theory can then be applied to define an update signal. In an exemplary embodiment, a Proportional Error Plus Integral Error update signal is defined with a corresponding Proportional Error Gain and an Integral Error Gain. Both Gains are set for minimizing noise injection while maximizing responsiveness to changing streaks. Both Gains are set to 0.2. As in standard PI controllers, the integrator is initialized to 0 when the control loop starts. Further, integrator windup is avoided by disabling the integrator when the error does not decrease on successive iterations of the control loop. This update is in the reflectance space so as to deliver equal convergence rate for all area coverage levels in the presence of non-linear open loop system response.

Figure 8:
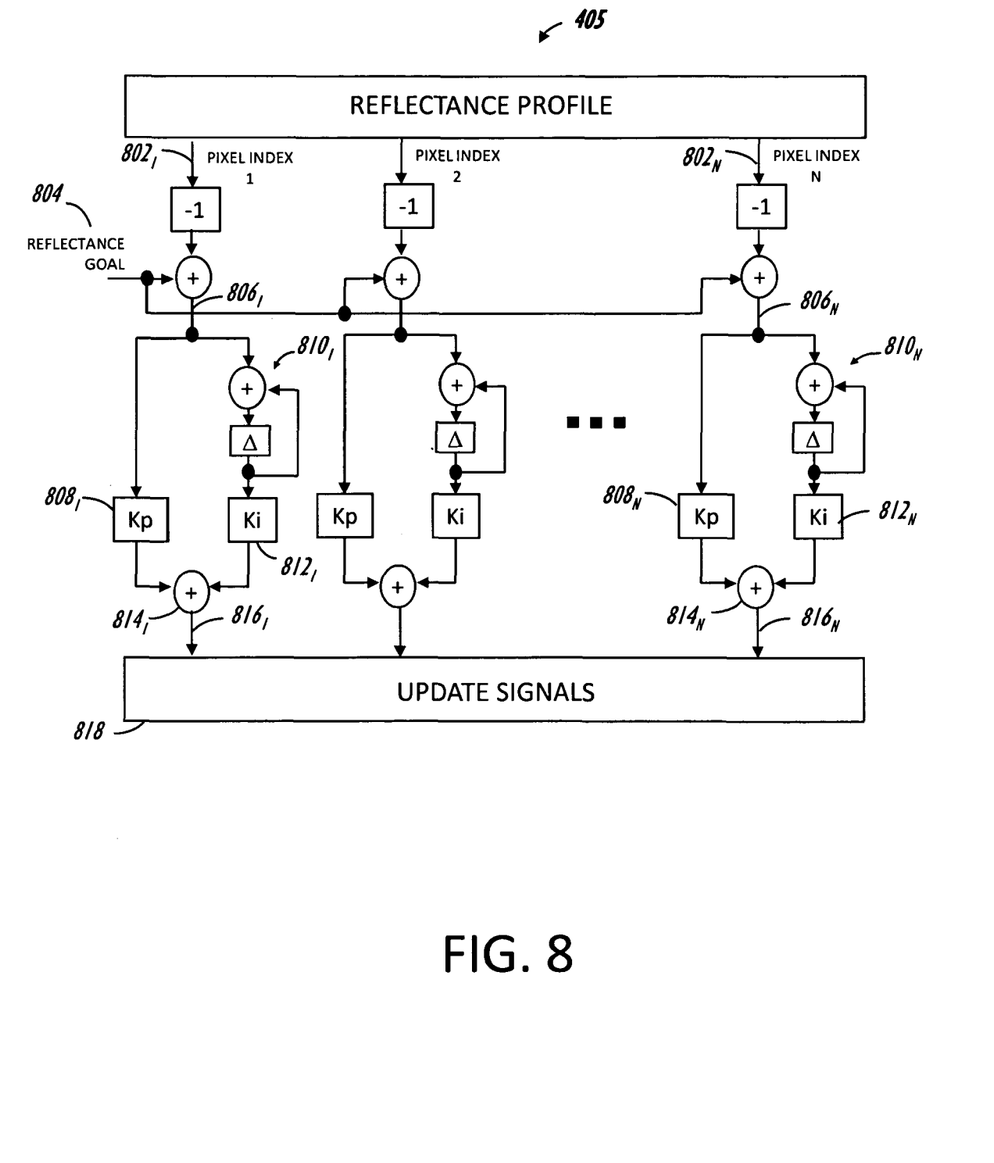
FIG. 8 illustrates a parallel controller bank for determining update signals.

A parallel controller bank for calculating the update signals is depicted generally at 800 in FIG. 8. Each reflectance profile is broken up into the reflectance value for each pixel index, as shown at $802_1$-$802_N$ respectively. The reflectance values for each pixel index are processed using the same operations. The reflectance values are first subtracted from the Reflectance Goal 804 to determine an error signal $806_1$-$806_N$, respectively. The error signal $806_1$-$806_N$ is then split into two paths. In the first path, the error signal is simply scaled $808_1$-$808_N$, respectively. In the second path, the error signal is integrated over time $810_1$-$810_N$, respectively, using a delay and feedback technique well known to those skilled in the art. The integrated error signal from the second path is then also scaled $812_1$-$812_N$, respectively. The two scaled signals from the two paths are then added together $814_1$-$814_N$, respectively, to form the update signal for that pixel index $816_1$-$816_N$, respectively. The update signals from all the pixel indices are the aggregated to form the update signal. A separate controller bank 800 is used for each reflectance profile representing each input area coverage level used in the reflectance measurements.

The Input to the Inverse Interpolation operation is then formed at 416 by setting the inverse interpolation inputs to the sum of the update signals and reflectance goals. The Reflectance Goal determined for that profile is not modified.

Steps including inverse interpolation of the Spatially Varying printer model 417, compressing across the pixel indices 418, expanding across the gray levels 419 and transmitting to STRC Application Module 420 are similar to corresponding steps 407 through 410 described in the respective Cycle Up procedures with reference to FIG. 4 above.

After the new Spatially-Varying TRCs are transmitted to the STRC Application Module at 420, printing continues in the standard manner with the print job images processed with the new Spatially-Varying TRCs to compensate for streaks in the output prints at 421. In an exemplary embodiment, the interdocument zone becomes available to print patches 316b to determine streak profiles and the system performs the Measure Profiles step 412 during the print job.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method performed by an image processing device for compensating for streak defects in images formed by a digital printer having a full width sensing device and a spatially varying Tone Reproduction Curve (STRC) application device comprising:
   generating a first set of test images on a sensing substrate;
   sensing the cross-process reflectance of the first set of test images on a sensing substrate;
   generating a first set of reflectance profile data using the sensed cross-process reflectance of the first set of test images;
   generating a spatially varying Printer Model from the first set of reflectance profile data;
   generating a first set of goal reflectance data from the first set of reflectance profile data;
   generating a spatially varying Tone Reproduction Curve (STRC) from the spatially varying Printer Model and the first set of goal reflectance data; and
   generating a first streak-corrected image using the STRC.

2. The method of claim 1 further comprising:
   generating a second set of test images on a sensing substrate;
   sensing the cross-process reflectance of the second set of test images on the sensing substrate;
   generating a second set of reflectance profile data using the sensed cross-process reflectance of the second set of test images;
   generating a second set of goal reflectance data from the second set of reflectance profile data;
   generating control data from the second set of goal reflectance data and the second set of reflectance profile data
   generating a spatially varying Tone Reproduction Curve (STRC) from the spatially varying Printer Model, the second set of goal reflectance data, and the control data; and
   generating a second streak-corrected image using the STRC.

3. The method of claim 2 wherein the image forming machine is a color image forming machine using a plurality of separate color channels further comprising:
   generating the first image set by developing first full width test patches including separate gray level patches for each color channel; and
   generating the second image set by developing second full width test patches including separate gray level patches for each color channel.

4. The method of claim 2 further comprising:
   performing subsequent iterations by repeating the generating and sensing steps to further reduce streaks.

5. The method of claim 2 where the generating control data step comprises generating an error signal and an integral error signal.

6. The method of claim 5 further comprising using an error compensation parameter and an integral error compensation parameter.

7. The method of claim 5 wherein generating an error signal and an integral error signal further comprises executing integrator anti windup calculations and logic.

8. The method of claim 7 wherein the executing integrator anti windup calculations and logic further comprises inhibiting integral calculations when the reflectance value does not change significantly from the past iteration to the present iteration.

9. The method of claim 2 wherein the generating a second set of test images on a sensing substrate includes generating the second set of test images in one of an interdocument zone and a customer image zone.

10. The method of claim 2 wherein the step of generating a spatially varying Tone Reproduction Curve (STRC) from a spatially varying Printer Model, a second set of goal reflectance data, and control data further comprises:
   generating a singular value decomposition; and
   generating a linear interpolation expansion.

11. The method of claim 2 wherein the step of generating a second set of test images on a sensing substrate further comprises using the first set of test images.

12. The method of claim 2 wherein generating a second set of goal reflectance data from a second set of reflectance profile data further comprises averaging the reflectance profile data at the location of a process controls sensor.

13. The method of claim 1 wherein the generating a first set of test images on a sensing substrate includes generating the first set of test image in a customer image zone.

14. The method of claim 1 wherein the generating a first set of reflectance profile data further comprises reducing noise in the sensed cross-process reflectance of the first set of test images.

15. The method of claim 14 further comprising generating a singular value decomposition of the sensed cross-process reflectance of the first set of test images.

16. The method of claim 1 wherein the sensing the cross-process reflectance comprises sensing the images using one of a Full Width Array sensor and a reduction optics camera.

17. The method of claim 1 wherein the step of generating a spatially varying Tone Reproduction Curve (STRC) from a spatially varying Printer Model and a first set of goal reflectance data further comprises:
   generating a singular value decomposition; and
   generating a linear interpolation expansion.

18. The method of claim 1 wherein the generating a first set of test images on a sensing substrate comprises generating images on one of a photoreceptor belt, a photoreceptor drum, an intermediate belt, an intermediate drum, a solid ink jet drum, and a final output media.

19. The method of claim 1 wherein generating a first set of goal reflectance data from a first set of reflectance profile data further comprises averaging the reflectance profile data at the location of a process controls sensor.

20. The method of claim 1 wherein the generating a first set of test images on a sensing substrate comprises generating images using one of an electrophotographic printer, an ink jet printer, and a solid ink jet printer.

21. A digital printing machine comprising:
   a sensor sensing the cross-process reflectance of a first set of test images;
   a signal processing and control unit generating a first set of reflectance profile data using the sensed cross-process reflectance of the first set of test images and generating a spatially varying Printer Model from a first set of reflectance profile data, the signal processing and control unit generating a first set of goal reflectance data from a first set of reflectance profile data and generating a spatially varying Tone Reproduction Curve (STRC) from the spatially varying Printer Model and the first set of goal reflectance data for generating a first streak-corrected image.

* * * * *